United States Patent [19]

Svartz

[11] Patent Number: 4,541,642
[45] Date of Patent: Sep. 17, 1985

[54] JUVENILE VEHICLE

[76] Inventor: Bjorn O. Svartz, 1408 Woodgreen Dr., Greensboro, N.C. 27420

[21] Appl. No.: 517,212

[22] Filed: Jul. 25, 1983

[51] Int. Cl.[4] .............................................. B60K 9/00
[52] U.S. Cl. ..................................... 280/3; 254/278; 280/151; 446/431
[58] Field of Search .................... 280/151, 3; 254/278; 446/436, 451, 465, 431

[56] References Cited

U.S. PATENT DOCUMENTS

| 348,619 | 9/1886 | Courtney | 280/220 |
|---|---|---|---|
| 1,006,045 | 10/1911 | Bartholomew | 280/243 |
| 2,049,345 | 7/1936 | Young | 280/236 |
| 2,438,414 | 3/1948 | Riboud | 280/3 |
| 2,601,006 | 6/1952 | Rodabaugh | 446/451 |
| 3,039,790 | 6/1962 | Trott | 280/251 |
| 3,760,905 | 9/1973 | Dower | 185/2 |
| 3,884,501 | 5/1975 | Elias et al. | 280/251 |
| 4,159,042 | 6/1979 | Jayner | 185/40 H |

FOREIGN PATENT DOCUMENTS

| 97972 | 4/1924 | Austria | 280/151 |
|---|---|---|---|
| 1040415 | 10/1958 | Fed. Rep. of Germany | 254/278 |

Primary Examiner—John A. Pekar

[57] ABSTRACT

A juvenile vehicle is demonstrated herein which is powered by unwinding a cable from a continuous stepped drum. In the preferred form of the vehicle the cable is unwound and the drum rotates at a faster and faster speed thus causing the vehicle to rapidly accelerate. The preferred method demonstrates the steps of winding the cable on the drum and imparting external power to the cable to thereby cause the drum to rotate.

13 Claims, 5 Drawing Figures

JUVENILE VEHICLE

BACKGROUND OF THE INVENTION

1. Field of the Invention

This invention relates to a manually powered vehicle as may be used by children for riding, racing or other games.

2. Description of the Prior Art

Various wheeled vehicles have been developed for children in the past whereby the rider can peddle the vehicle or use the forces of gravity to ride down hills. One such vehicle using the energy of the driver to propel it is shown in U.S. Pat. No. 3,884,501. As shown therein, the rider peddles the vehicle and its speed is dependent in part on the strength and endurance of the driver.

The invention as presented herein depends on external power, i.e. manual forces external of the vehicle which are used to rotate a cable receiving drum positioned on the vehicle which turns the wheels and causes the vehicle to rapidly accelerate thereby leaving the driver's attention to steering or braking the vehicle as it moves forward.

OBJECTS OF THE INVENTION

It is a general object of the invention to provide an improved method and vehicle for propelling children or others for relatively short time periods.

It is another object of the present invention to provide a vehicle which rapidly accelerates from a stopped position utilizing an external manual force.

It is yet another object of the present invention to provide a vehicle which includes a rotatably mounted continuous stepped cable receiving drum and a suitable gear mechanism to translate power from the drum to the driving wheels.

It is still another object of the present invention to provide a vehicle which may be powered by one or more non-riding persons; and It is yet another object of the present invention to provide a juvenile vehicle which is relatively light in weight and inexpensive to manufacture.

Other objects and advantages of the present invention will become apparent to those skilled in the art as the details of the invention are more fully revealed below.

SUMMARY OF THE INVENTION

The above-mentioned objects of the invention are accomplished by utilizing a ridable wheeled vehicle which is powered by a continuous stepped drum which is rotated by externally unwinding a cable wound thereon. As the stepped drum rotates, a chain drive or any other suitable gear mechanism translates the power from the drum to the rear wheels which propel the vehicle. The stepped drum may have two or more segments or "steps" with different diameters thus providing different speeds to the vehicle relative to the speed of the cable which is unwound from the drum.

BRIEF DESCRIPTION OF THE DRAWINGS AND PREFERRED EMBODIMENT

FIG. 1 illustrates in schematic fashion the operation of the invention;

FIG. 2 demonstrates the preferred embodiment of the vehicle with a rider positioned thereon;

FIG. 3 demonstrates a bottom plan view of the vehicle of FIG. 2;

FIG. 4 demonstrates a top view of certain of the rear portion of the vehicle as shown in FIG. 3; and FIG. 5 demonstrates a schematic side view of the drum brake of the invention.

The juvenile vehicle 10 as shown in the preferred embodiments in FIGS. 2 and 3 includes a frame member 11 to which are attached two front wheels 12 and two rear wheels 13 formed of polyurethane or other durable materials. Drum means 14 as shown in FIG. 3 comprises a stepped drum having five "steps" or diameters and is rotatably mounted. When cable means 15 is pulled drum means 14 rotates and will supply impetus to vehicle 10 through chain drive means 16. Vehicle 10 is steered by the rider's feet by pressing steering bar 17 either to the left or to the right as desired. The preferred embodiment of the vehicle 10 as shown in FIG. 3 also includes braking mechanism 26 which is shown enlarged in FIG. 4.

The preferred method of the invention is best illustrated in FIG. 1 where cable means 15 is shown attached to drum means 14 of vehicle 10. Cable 15 is rapidly unwound from drum 14 by the force applied by the persons illustrated schematically at A, B and C of FIG. 1. As each person pulls in the direction as indicated by the arrows, cable means 15 is unwound and drum means 14 rotates rear wheel means 13, thus accelerating the vehicle.

DETAILED DESCRIPTION OF THE DRAWINGS AND OPERATION OF THE INVENTION

Figure 1:
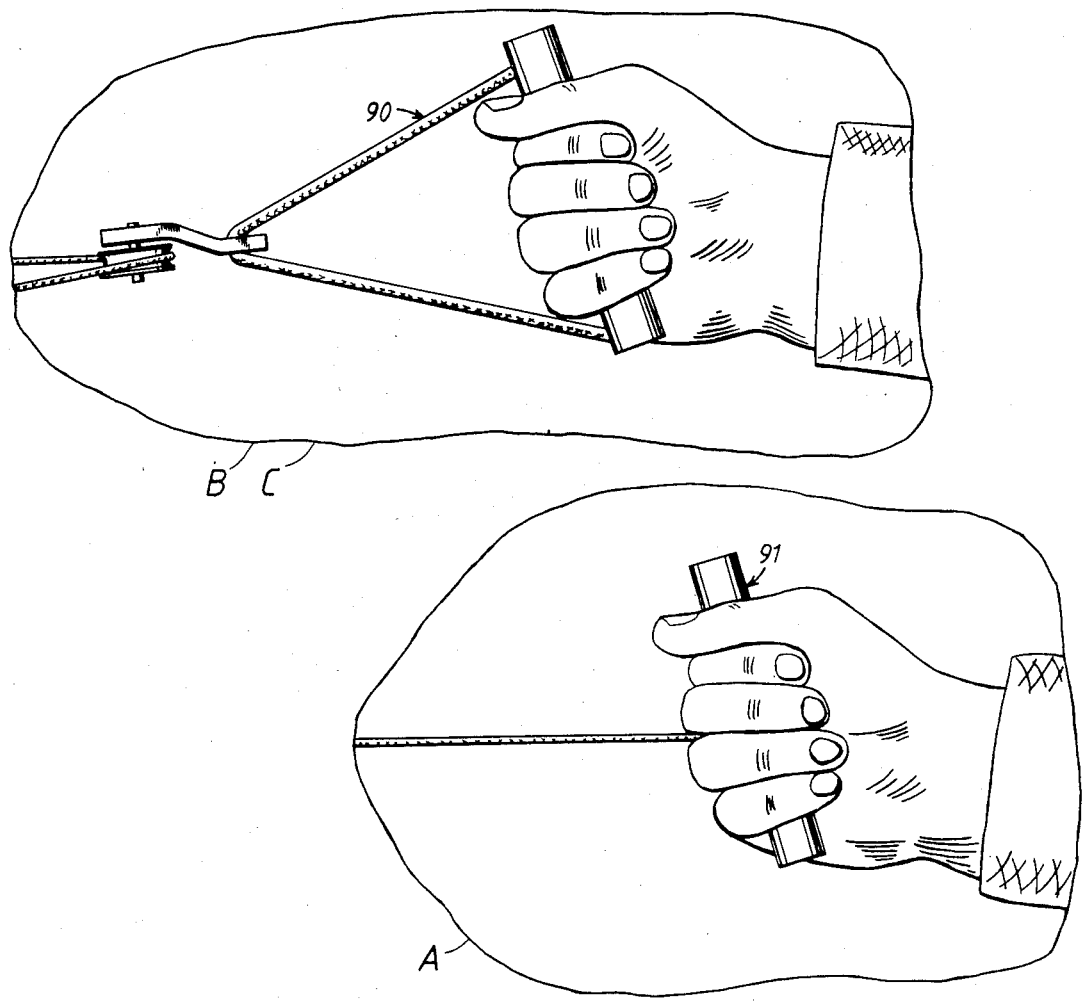
Figure 1:
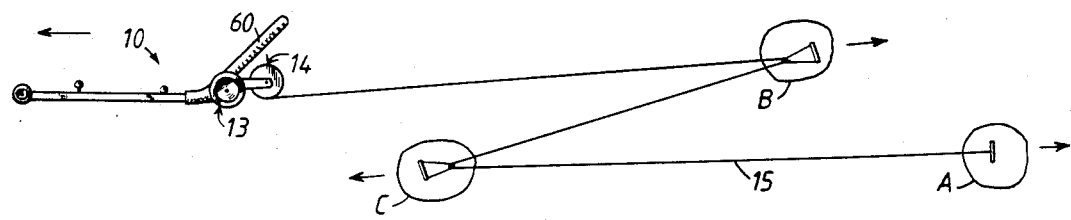
Figure 3:
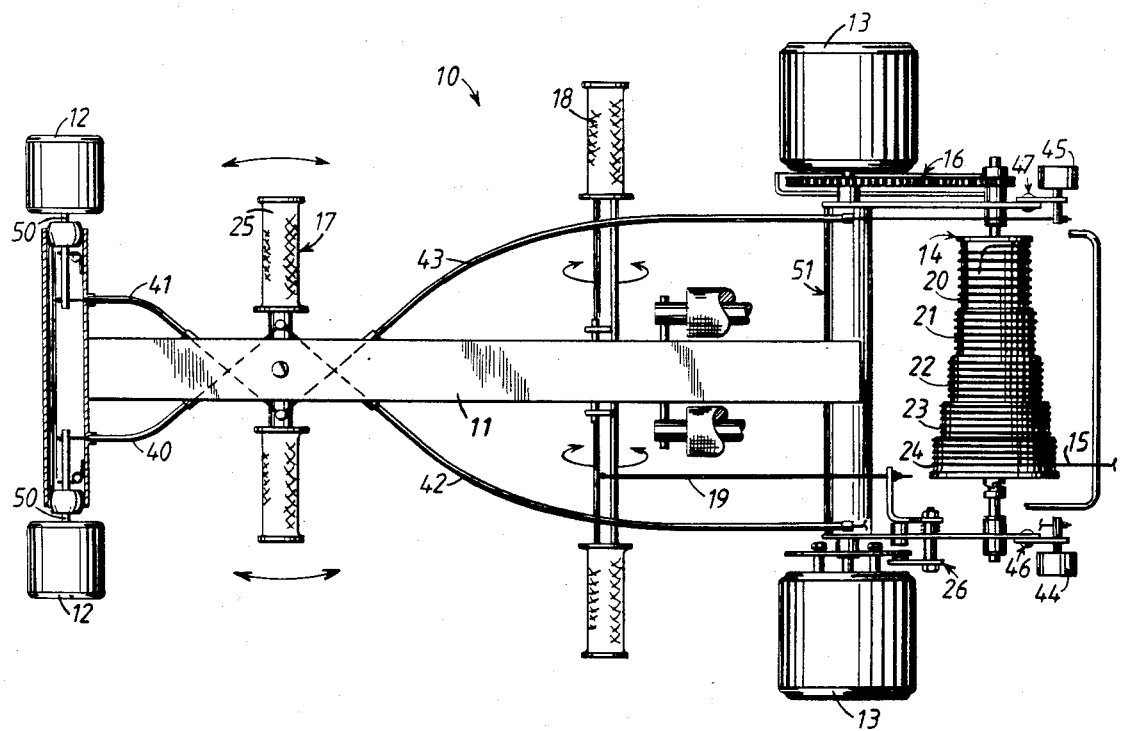

In typical use of invention 10 as shown in FIG. 1, vehicle 10 would be placed on a flat paved parking lot or track with cable means 15 as shown in FIG. 3 wound on drum means 14. It should be noted that cable means 15 is wound from the smaller to the larger drum "steps" or diameters, with the smallest outer drum means diameter being characterized by the number 20 and with the largest diameter being characterized by 24. Thus, drum means 14 has cable receiving capacity and is stepped in a continuous nature, continuous meaning herein of a construction to allow cable means 15 to smoothly and continuously move from one step to another during the unwinding or winding process.

Figure 2:
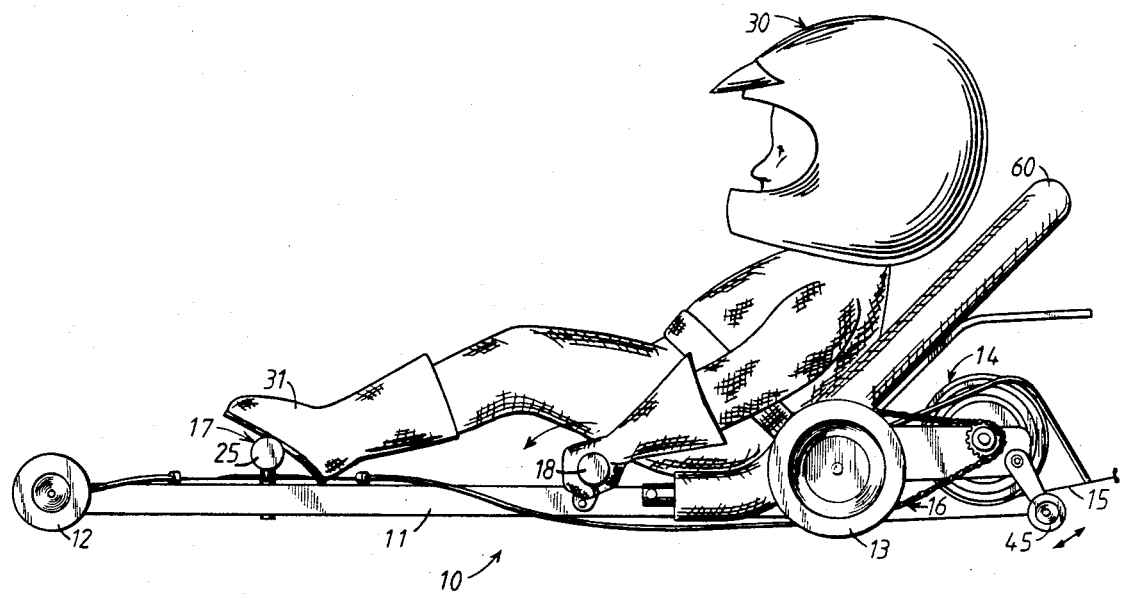

As would be understood a larger external power can be generated to vehicle 10 through cable means 15 with three persons as schematically shown in FIG. 1 than by a single person. Rider 30 can steer vehicle 10 by steering bar 17 with left and right foot pressure. If the left foot 31 of driver 30 as shown in FIG. 2 presses steering bar 17 forward then the vehicle will turn to the right, in part due to the pivoting of front stub axle means 50 in a counter-clockwise direction as shown in FIG. 3, it being understood that FIG. 3 is a bottom plan view. When tension is applied by steering bar 17 through front steering cables 40 and 41 simultaneously with the pivoting action of front stub axle means 50, rear steering cable 42 is tightened thus causing rear steering wheel 44 to pivot downward about axis 46 causing left rear wheel means 13 (shown at the bottom in FIG. 3) to lift slightly above the ground or track. Thus, as left rear wheel means 13 is lifted, the right rear wheel means 13, by having traction with the ground, causes vehicle 10 to turn in a right direction. Only a slight lifting of either left or right rear wheel means 13 is required and total lifting from the ground or track surface is not required for steering purposes.

Figure 4:
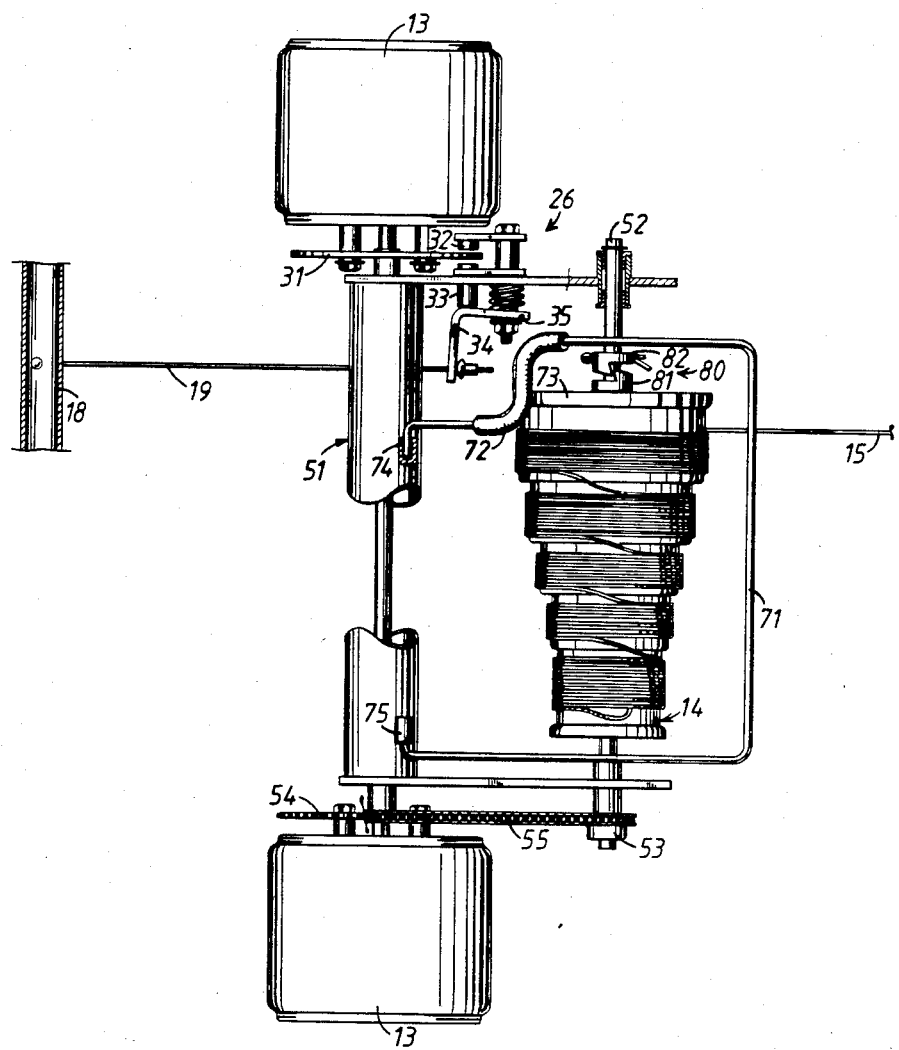

Braking is applied to vehicle 10 as shown in FIG. 2 by rider 30 by rotating braking bar 18 in a counter-clockwise direction as shown in FIG. 2. By counter-clockwise rotation, braking cable means 19 as seen in FIGS. 3 and 4 causes brake disk 31 to be frictionally engaged by brake pads 32 and 33 of brake means 26 as shown in FIG. 4. As further shown in the enlarged view of FIG. 4, when rider 30 applies the brakes to vehicle 10, braking cable 19 causes L-shaped member 34 to rotate about point 35 thus forcing brake pads 32 and 33 into braking disk 31 which is affixed to rear wheel means 13 thus causing vehicle 10 to slow or stop as desired. It has been found that a single brake mechanism 26 is sufficient although dual brake mechanism can be affixed.

In general operation, drum means 14 is wound with cable means 15 and rider 30 is seated in vehicle 10 on seat member 60 which is attached to frame member 11. One or more persons then pull cable means 15 causing it to rotate drum means 14. As drum means 14 is wound from the smallest step (20 in FIG. 3) to the largest step (24 in FIG. 3), cable means 15 is unwound from step 24 which has the largest diameter to the smallest step 20. As cable means 15 is unwrapped from drum means 14, it follows the surface of drum means 14 in a descending smooth, even fashion. Thus, less rotation of drum means 14 initially occurs per unit length of cable means and as the unwinding continues, a higher and higher rotational speed is achieved by drum means 14 and vehicle 10 thereby accelerates.

As shown in FIG. 4, drum means 14 turns on drum axle 52. Also positioned on drum axle 52 is rear sprocket member 53 which is connected to front sprocket member 54 by chain means 55, shown schematically in FIG. 4. Thus, when cable means 15 is pulled, drum means 14 is rotated which in turn causes rear wheel means 13 to turn. Chain drive means 16 which includes front sprocket member 54, rear sprocket member 53 and chain means 55 as shown in FIG. 4, causes rear wheel means 13 to rotate and thus vehicle 10 is propelled.

Figure 5:
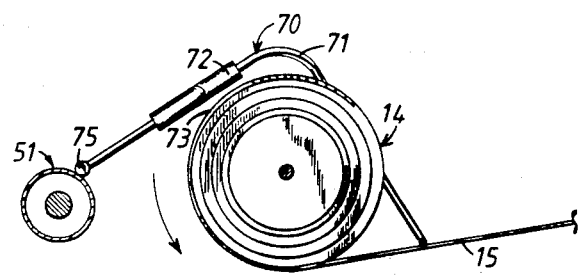

Drum brake 70 will terminate the rotation of drum means 14, when for example cable means 15 breaks thus preventing a gnarled or back-lash of cable 15 on drum means 14. Drum brake 70 includes cable bar 71 and drum pad 72. Drum pad 72 will engage drum edge 73 as shown in FIG. 4 in a frictional manner to terminate to counter-clockwise rotation of drum means 14 as depicted in FIG. 5. Cable bar 71 is pivotally mounted along rear axle means 51 at 74 and 75 as shown in FIG. 4. Thus, if cable means 15 would break or be removed from drum means 14, the force of gravity would cause cable bar 71 to descend and drum pad 72 would engage drum edge 73 causing drum means 14 to discontinue rotation.

Clutch assembly 80 is also shown in FIG. 4 which allows drum means 14 to be engaged in a counter-clockwise direction as shown in FIG. 5, and if drum means 14 is turned in a clockwise direction, chain drive means 16 is then disengaged. Clutch means 80 is composed of male portion 81 and female portion 82 and as shown, male portion 81 is rigidly affixed to drum means 14 whereas female portion 82 is rigidly secured to drum axle 52.

Although impetus can be applied to vehicle 10 by unwinding cable means 15 by mechanical means or means other than by manual force, it has been found that one to three persons can adequately propel vehicle 10. As shown in FIG. 1, a typical set-up is illustrated in which three persons, two of which use pulley handle 90 as shown at 1-B and one person uses the pull handle 91 as shown at 1-A. Thus, in a typical arrangement, a large power is thus imparted to drum means 14 by three persons running in somewhat opposite directions whereby vehicle 10 will rapidly accelerate from a standing start.

Various modifications and different embodiments of the invention will suggest themselves to those skilled in the art without departing from the scope of the invention. The illustrations and examples as presented are for illustrative purposes and are not intended to limit the scope of the invention as shown herein.

I claim:

1. A riding vehicle comprising: a frame member, a wheel, said wheel attached to said frame member, a cable receiving drum means, drive means, said drive means joined to said drum means and to said wheel, said drum means rotatably mounted on said frame member for providing impetus to the vehicle by turning said wheel, cable means, said cable means for winding on said drum means, and external power means, said power means for grasping said cable means and applying force thereto, said force being substantially horizontal from said drum means for rapidly unwinding said cable means from said drum means whereby the vehicle moves in a direction substantially opposite the direction of the force applied to said cable means.

2. A riding vehicle as claimed in claim 1 when said drum means comprises a stepped drum means.

3. A riding vehicle as claimed in claim 2 where said stepped drum means is continuous.

4. A riding vehicle as claimed in claim 1 wherein said drive means comprises chain drive means, said chain drive means joined to said cable receiving drum means.

5. A vehicle comprising: a frame member, a wheel, said wheel attached to said frame member, a continuous stepped drum means having a large and a small step, said drum means rotatably mounted on said frame member for providing impetus to the vehicle by turning said wheel during rotation, cable means, said cable means wound first around said small step and continuing around said large step whereby rapidly unwinding said cable means provides impetus to the vehicle.

6. A vehicle as claimed in claim 5 wherein said continuous stepped drum means includes five steps.

7. A vehicle as claimed in claim 5 and including a seat member, said seat member attached to said frame member.

8. A vehicle as claimed in claim 5 and including steering means, said steering means attached to said frame member.

9. A vehicle as claimed in claim 5 and including a rear axle, said rear axle rotatably affixed to said frame member, brake means, said brake means attached to said rear axle.

10. A method for providing impetus to a wheeled vehicle comprising: continuously winding a cable onto a drum means of the vehicle which is drivingly connected to a wheel, imparting an external substantially horizontal force to the cable, unwinding the cable and rotating the drum means to thereby accelerate the vehicle in a direction opposite from the force applied to said cable.

11. A method for providing impetus to a wheeled vehicle as claimed in claim 10 whereby winding a cable on a drum means comprises winding a cable on a stepped drum means.

12. A method of providing impetus to a wheeled vehicle as claimed in claim 11 whereby winding the cable on a stepped drum means comprises winding a cable on a continuous stepped drum means.

13. A method of providing impetus to a wheeled vehicle as claimed in claim 10 wherein imparting an external force to the cable comprises manually pulling the cable from the drum means.

* * * * *